(12) United States Patent
Berkes et al.

(10) Patent No.: US 9,354,804 B2
(45) Date of Patent: May 31, 2016

(54) TOUCH EVENT ANTICIPATION IN A COMPUTING DEVICE

(75) Inventors: Otto Berkes, Seattle, WA (US); Avi Geiger, Seattle, WA (US); Meredith E. Amdur, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 392 days.

(21) Appl. No.: 12/981,184

(22) Filed: Dec. 29, 2010

(65) Prior Publication Data

US 2012/0169646 A1 Jul. 5, 2012

(51) Int. Cl.
*G06F 3/0488* (2013.01)
*G06F 3/01* (2006.01)
(Continued)

(52) U.S. Cl.
CPC .............. *G06F 3/0488* (2013.01); *G06F 3/011* (2013.01); *G06F 3/017* (2013.01); *G06F 3/042* (2013.01); *G06F 3/044* (2013.01); *G06F 3/045* (2013.01); *G06F 3/0412* (2013.01);
(Continued)

(58) Field of Classification Search
CPC .......... G06F 3/01; G06F 3/011; G06F 3/017; G06F 3/0412; G06F 3/0416; G06F 3/042; G06F 3/044; G06F 3/045; G06F 3/04817; G06F 3/0482; G06F 3/0488; G06F 2203/04101; G06F 2203/04104; G06F 2203/04108
USPC ................................................. 345/156–184
See application file for complete search history.

(56) References Cited

U.S. PATENT DOCUMENTS 4,986,280 A 1/1991 Marcus et al.
5,845,048 A 12/1998 Masumoto
(Continued)

FOREIGN PATENT DOCUMENTS

CN 1820248 A 8/2006
JP 2003005912 A 1/2003
(Continued)

OTHER PUBLICATIONS

Alon., "Public Class Alon : ISmartHome, ICPP, Home Server, IMedia Center", Retrieved at << http://blogs.microsoft.co.il/blogs/alon/archive/2009/03/14/finally-our-windows-7-net-wrappers-are-out.aspx >>, Mar. 14, 2009, pp. 1-6.
(Continued)

*Primary Examiner* — David Tung
(74) *Attorney, Agent, or Firm* — Aneesh Mehta; Kate Drakos; Micky Minhas

(57) ABSTRACT

Systems and methods for anticipation of touch events in a computing device are provided. The computing device may include a multi-touch sensitive display including a sensor configured to sense a position and/or movement of a hand. A graphical user interface (GUI) may be displayed, having a state including a plurality of possible touch inputs. The computing device may further include a touch event prediction module configured to compute one or more anticipated touch inputs based on the sensed hand position and/or movement, and the state of the GUI with the plurality of possible user inputs. The computing device may further include a preprocessing module configured to preprocess data for each anticipated touch input, and upon the detection of an actual touch input received from the user that matches one of the anticipated touch inputs, displaying the preprocessed data for the actual touch input on the GUI.

14 Claims, 5 Drawing Sheets

(51) Int. Cl.
*G06F 3/041* (2006.01)
*G06F 3/042* (2006.01)
*G06F 3/044* (2006.01)
*G06F 3/045* (2006.01)
*G06F 3/0481* (2013.01)
*G06F 3/0482* (2013.01)

(52) U.S. Cl.
CPC .......... *G06F 3/0416* (2013.01); *G06F 3/0482* (2013.01); *G06F 3/04817* (2013.01); *G06F 2203/04101* (2013.01); *G06F 2203/04104* (2013.01); *G06F 2203/04108* (2013.01)

(56) References Cited

U.S. PATENT DOCUMENTS

| | | | |
|---|---|---|---|
| 7,042,440 B2 | 5/2006 | Pryor et al. | |
| 7,747,749 B1* | 6/2010 | Erikson et al. | 709/226 |
| 7,764,274 B2 | 7/2010 | Westerman et al. | |
| 2002/0158920 A1* | 10/2002 | Abrams | 345/856 |
| 2007/0070052 A1 | 3/2007 | Westerman et al. | |
| 2007/0075981 A1 | 4/2007 | Hsieh et al. | |
| 2008/0231610 A1 | 9/2008 | Hotelling et al. | |
| 2009/0007001 A1 | 1/2009 | Morin et al. | |
| 2009/0207154 A1* | 8/2009 | Chino | 345/175 |
| 2009/0278816 A1* | 11/2009 | Colson | 345/175 |
| 2009/0289911 A1 | 11/2009 | Nagai | |
| 2009/0325693 A1 | 12/2009 | Ron | |
| 2010/0134424 A1 | 6/2010 | Brisebois et al. | |
| 2010/0228539 A1 | 9/2010 | Slocum et al. | |

FOREIGN PATENT DOCUMENTS

| | | |
|---|---|---|
| JP | 2006178625 A | 7/2006 |
| JP | 2006236143 A | 9/2006 |
| JP | 2009217416 A | 9/2009 |
| JP | 2009238087 A | 10/2009 |
| JP | 2010176329 A | 8/2010 |
| JP | 2011170834 A | 9/2011 |
| KR | 1020040031195 A | 4/2004 |
| KR | 1020100122383 A | 11/2010 |
| TW | 200634635 A | 10/2006 |
| TW | 201019191 A | 5/2010 |
| WO | 2009116285 A1 | 9/2009 |

OTHER PUBLICATIONS

Dalton., "Sensing User Intention and Context for Energy Management", << Retrieved at http://www.usenix.org/events/hotos03/tech/full_papers/dalton/dalton.pdf>>, May 18-21, 2003, pp. 7.

Rashid, et al., "Relative Keyboard Input System", Retrieved at << http://www.cs.cmu.edu/~nasmith/papers/rashid+smith.iui08.pdf >>, Jan. 2008, pp. 1-4.

Wroblewski, Luke, "Apple's Proposed Multi-Touch UI System," <http://uxmag.com/design/apple039s-proposed-multi-touch-ui-system>, Jan. 19, 2010, 4 pages.

"International Search Report", Mailed Date: Sep. 27, 2012, Application No. PCT/US2011/067419, Filed Date: Dec. 27, 2011, pp. 8.

The State Intellectual Property Office of the People's Republic of China, First Office Action and Search Report Received for Chinese Patent Application No. 201110453652.7, Apr. 28, 2014, 14 Pages.

The State Intellectual Property Office of the People's Republic of China, Notice of Allowance Issued in China Patent Application No. 201110453652.7, Nov. 3, 2014, 4 Pages.

Taiwan Intellectual Property Office, Office Action and Search Report issued in Taiwan Patent Application No. 100143765, Date of Research: Nov. 12, 2015, Taiwan, 11 pages. (Submitted with translation of Search Report).

* cited by examiner

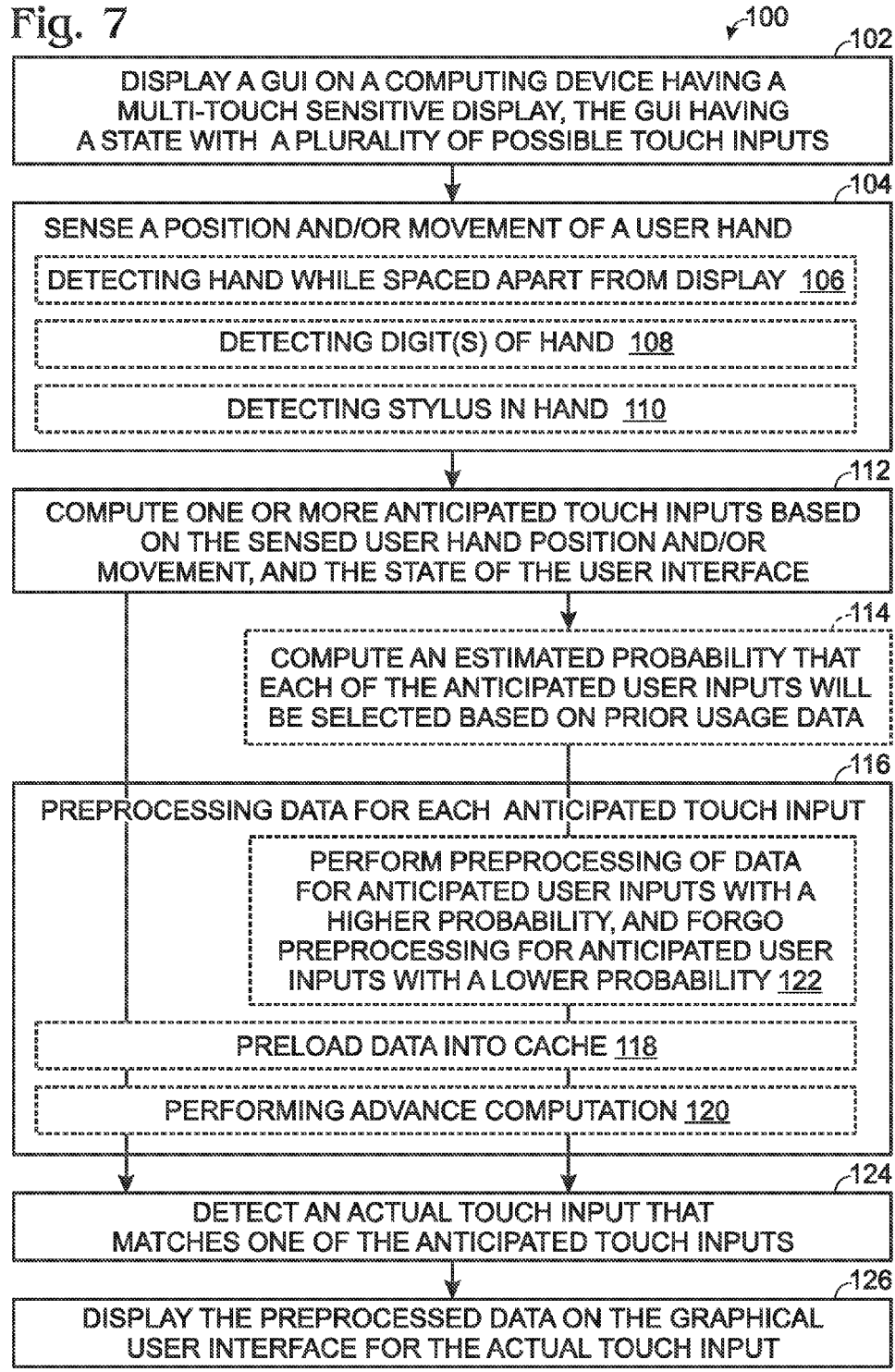

TOUCH EVENT ANTICIPATION IN A COMPUTING DEVICE

BACKGROUND

Touch sensitive computing devices such as mobile telephones and tablet computers have become increasingly portable with the development of smaller processors and memory devices. Further, consumers have demanded increasingly complex software running on such devices, including email, games, photos, movies, and various other applications. Further, these touch sensitive computing devices typically utilize gesture-based input, which consumes processing power. To handle these tasks, processors and memory of increasingly high performance are continually being developed with smaller footprints.

Nonetheless, the software and hardware are sometimes incapable of keeping pace with the user. As a result, users sometimes experience a time lag during which the touch sensitive device appears to be "thinking" immediately after the user has selected a graphical user interface option or swiped a gesture on the screen. These time lags are frustrating to the user, as the user is not sure whether the device is properly functioning, whether the gesture input was properly received or needs to be re-input, whether the device is experiencing network connectivity issues, etc. During this moment of uncertainty, users often stare at their screens, frozen in a moment of frustration, unable to proceed with tasks within the computer environment, nor able to return to interacting with the environment around them. This degrades the user experience with the touch sensitive device, potentially harming the adoption of such devices, and also negatively affects the social interaction of the user with those persons around them.

SUMMARY

Systems and methods for anticipation of touch events in a computing device are provided. The computing device may include a multi-touch sensitive display including a sensor configured to sense a position and/or movement of a hand. A graphical user interface (GUI) may be displayed, having a state including a plurality of possible touch inputs. The computing device may further include a touch event prediction module configured to compute one or more anticipated touch inputs based on the sensed hand position and/or movement, and the state of the GUI with the plurality of possible user inputs. The computing device may further include a preprocessing module configured to preprocess data for each anticipated touch input, and upon the detection of an actual touch input received from the user that matches one of the anticipated touch inputs, displaying the preprocessed data for the actual touch input the on the GUI.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a flowchart illustrating an embodiment of a method for anticipation of one or more touch events.

DETAILED DESCRIPTION

Figure 1:
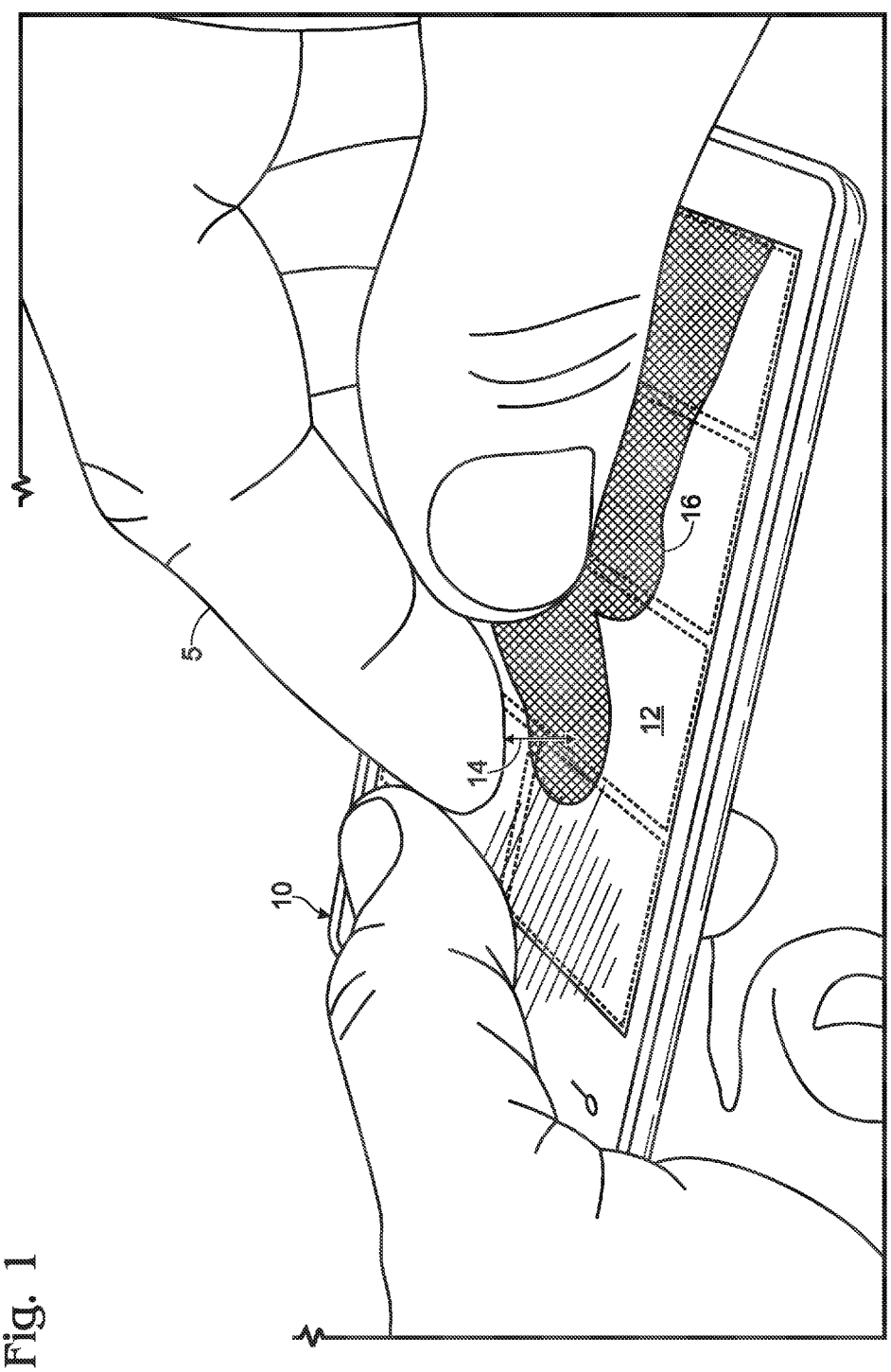
FIG. 1 is a perspective view illustrating one embodiment of a computing device configured for anticipation of one or more touch events.

FIG. 1 illustrates one embodiment of a computing device 10 configured for anticipation of one or more touch events. As the user prepares to make a touch input, the user's hand 5 approaches a touch sensitive display 12 of the computing device 10. The touch sensitive display 12 is configured to sense the user hand 5 using various sensing technologies described below, even when the hand 5 is spaced apart from a top surface of the display by a gap 14. From the point of view of the display 12, the hand may appear to cast a sensed shadow 16 on the display 12. The computing device is configured to interpret the position and movement of the hand and make predictions of one or more anticipated touch inputs that are likely to occur, and then perform preprocessing to reduce latency when the user actually performs one of the anticipated touch inputs. As a result, the response time of the computing device to the anticipated touch inputs may be improved, enhancing the user experience with the computing device and enabling the user to finish computer tasks more quickly and resume interacting with others, for example.

Figure 2:
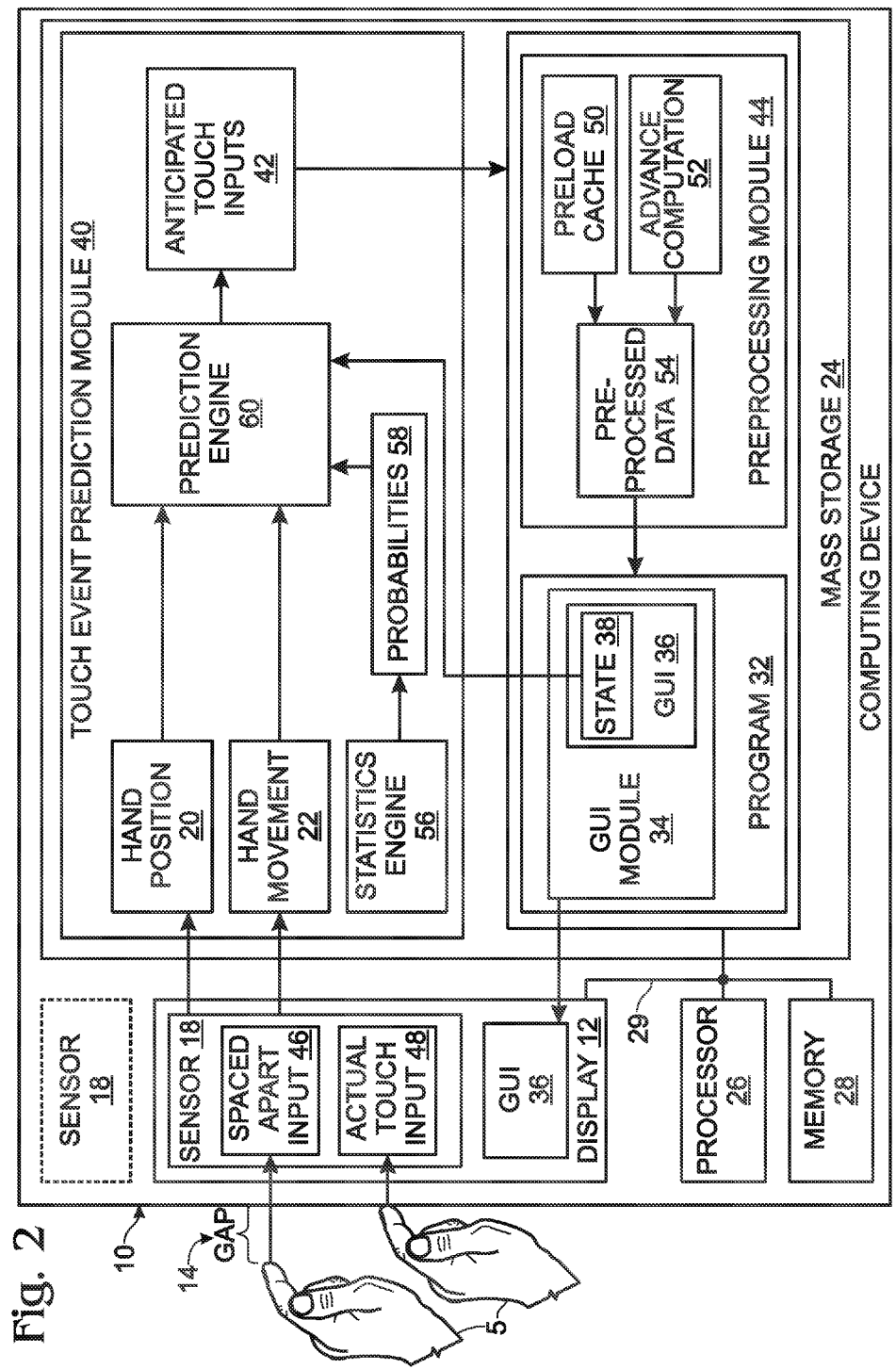
FIG. 2 is a schematic view illustrating a software and hardware configuration of the computing device of FIG. 1.

As shown in FIG. 2, computing device 10 typically includes a multi-touch sensitive display 12 including a sensor 18 configured to sense a hand position 20 and/or hand movement 22 of a user hand 5. In some embodiments, the sensor 18 may be configured to detect spaced apart input 46 indicating the position and/or movement of the hand when the hand is spaced apart a distance from a top surface of the display, as well as actual touch input 48 when the hand 5 is contacting the display 12. In some embodiments, sensor 18 may be configured to detect and distinguish between the position and movement of one or more digits of the hand, as well as the hand as a whole. Further, the sensor may be configured to detect the position or movements of a stylus held by the hand, and distinguish the stylus from the hand.

Sensor 18 may utilize one or more of a variety of sensor types. For example, sensor 18 may be or include one or more of an in-pixel optical sensor, capacitive touch sensor, resistive touch sensor, infrared sensor, pressure sensor, or other sensor type. The sensor 18 may be integrated into display 12, or formed separately from display 12, as indicated in dashed lines. For example, while capacitive, resistive, and in-pixel sensors are typically integrated with the display, an optical sensor such as a camera may be formed separately from the display and aimed to view the area above the display.

The computing device 10 includes one or more programs and modules stored in a mass storage unit 24, which are executable via processor 26 using portions of memory 28 to process sensor input 30 received from sensor 18 and output the processing results for display on display 12. The processor 26, memory 28, and mass storage unit 24 may communicate with one another and the display 12 via one or more data buses 29. A variety of processor, memory, and mass storage configurations may be utilized. In some embodiments the computing device is configured as a mobile telephone and/or a tablet, computing device and the memory and mass storage may both be solid state, for example. In other embodiments, the computing device may be a laptop computer, desktop computer, tabletop computer, kiosk computer, etc., and the mass storage may be a hard drive, for example.

Program 32 stored on mass storage unit 24 may be an application program, operating system component, or other program that includes a graphical user interface module 34 configured to generate and display a graphical user interface (GUI) 36 on the display 12. The graphical user interface typically includes a state 38 including a plurality of possible touch inputs. In the example shown in FIG. 1, the GUI 36 displayed on display 12 includes a plurality of selectable icons arranged in a tile pattern. Each icon represents a possible touch input for the user. Numerous other GUI configurations are possible, including elements such as buttons, pull down menus, sliders, scroll bars, hyperlinks, lists, radio buttons, each representing one or more possible touch inputs.

The computing device 10 further includes a touch event prediction module 40 stored on mass storage unit 24. Upon execution, the touch event prediction module 40 is configured to compute one or more anticipated touch inputs 42 based on the sensed user hand position 20 and/or hand movement 22, and the state 38 of the GUI 36 with the plurality of possible user inputs. Typically, the touch event prediction module 40 computes the anticipated touch inputs 42 based on sensed hand position 20 and hand movement 22 from spaced apart input 46 of a hand that is spaced apart from the display 12 by a gap 14.

The computing device 10 further includes a preprocessing module 44 stored on mass storage unit 24. The preprocessing module 44 is configured to generated preprocessed data 54 for each anticipated touch input 42. For example, the preprocessing module 44 may be configured to preload data into a preload cache 50 to be displayed upon the realization of an anticipated touch event, and/or perform advance computations 52 for an anticipated touch event.

Upon the detection of an actual touch input 48 by the user from contact of the user hand with the display 12 that matches one of the anticipated touch inputs 48, the preprocessing module 44 is configured to cause the preprocessed data 54 to be displayed on the graphical user interface for the actual touch input 48. It will be appreciated that the actual touch event may be detected by the touch event prediction module in one embodiment, or by a separate gesture recognition module in other embodiments. The preprocessing module may cause the preprocessed data 54 to be displayed by, for example, communicating to the program 32 that the preprocessed data 54 is available, and enabling the program to retrieve and display the preprocessed data from a predetermined location after it is informed of the actual touch event by the touch event prediction module, or alternatively by the above-mentioned gesture recognition module.

In the depicted embodiment, the touch event prediction module includes a statistics engine 56 configured to compute an estimated probability 58 that each of the anticipated user inputs 48 is selected based on prior usage data, and to instruct the preprocessing module to allocate preprocessing resources, such as the preload cache 50 and logic for advance computations 52, to one or more anticipated user inputs 48 with higher probability of selection, and to forgo preprocessing of the other anticipated user inputs 48. The prior usage data may be computed for the individual user on the computing device, for all users on the computing device, or may be aggregated usage statistics for a wide group of users downloaded from a central database over a computer network, for example.

A prediction engine 60 of the touch event prediction module may be configured to receive the hand position 20 and hand movement 22 of the spaced apart input 46 from sensor 18, and receive the GUI state 38 information from the GUI module 34, and the probabilities from the statistics engine 56, and compute a ranked list of anticipated touch inputs 42 that is ranked according to an estimated probability of occurrence. The preprocessing module may examine available memory and processor usage on the computing device to determine an available resource threshold for preprocessing activity that can be undertaken, and choose to generate preprocessed data 54 for a subset of anticipated touch inputs on the ranked list, up until the available resource threshold is reached. In this manner, efficient use of resources may be made, without over burdening the computing device 10.

It will be appreciated that the computing device may include an operating system that includes an application programming interface by which various programs communicate with and utilize operating system resources. Thus in one embodiment, the touch event prediction module 40 and the preprocessing module 44 may be part of the application programming interface linking programs to operating system functionality on the computing device. In other embodiments, the touch event prediction module 40 and the preprocessing module 44 are executable programs, such as services running in the background across user sessions, on the computing device 10.

Figure 3:
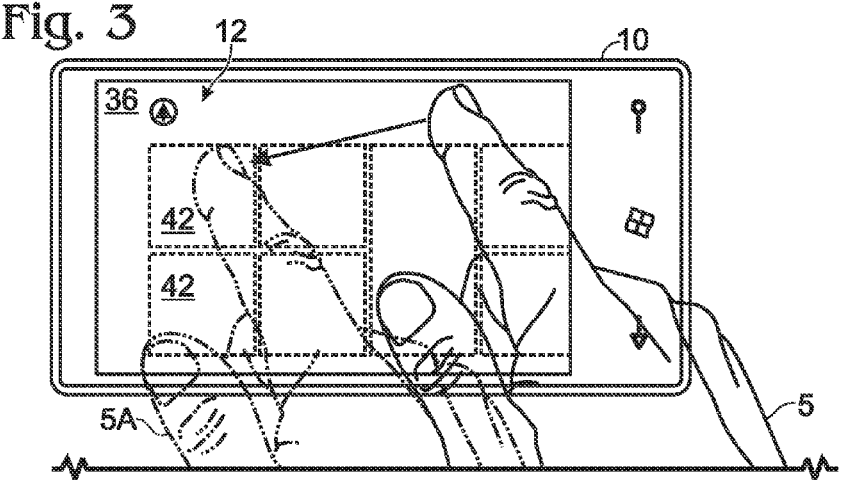
FIG. 3 is a top view illustrating the computing device of FIG. 1, shown with a first hand motion over the computing device.

FIG. 3 illustrates computing device 10 with a first hand motion being presented spaced apart from and over the display 12 of the computing device 10. The hand 5 is shown with an index finger outstretched and moving right to left from a first position of the hand, shown at 5, to a second position of the hand, shown at 5A. Whereas all of the tiled panes indicated in dashed lines represent separate selectable icons that are possible touch inputs on the GUI 36, upon detecting this right to left movement of the hand with an outstretched index finger, the touch event prediction module 40 may be configured to determine that the leftmost two icons are anticipated touch inputs 42, as indicated, since the index finger is likely to do the selecting and has moved past the remaining possible inputs on the GUI 36.

Figure 4:
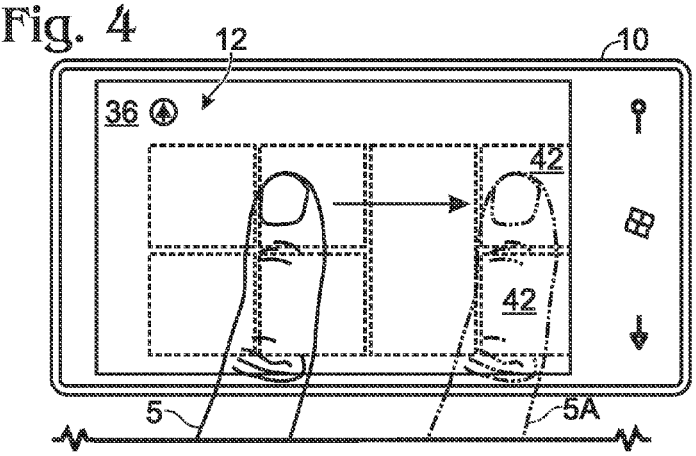
FIG. 4 is a top view illustrating the computing device of FIG. 1, shown with a second hand motion over the computing device.

FIG. 4 illustrates computing device 10 with a second hand motion being presented spaced apart from and over the display 12 of the computing device 10. A finger of hand 5 is shown outstretched and moving left to right from a first position of the finger of the hand, shown at 5, to a second position of the finger of the hand, shown at 5A. Upon detecting this left to right movement of the outstretched finger, the touch event prediction module 40 may be configured to determine that the rightmost two icons are anticipated touch inputs 42, as indicated, since the index finger, being outstretched, is likely to do the selecting and has moved past the remaining possible inputs on the GUI 36.

Figure 5:
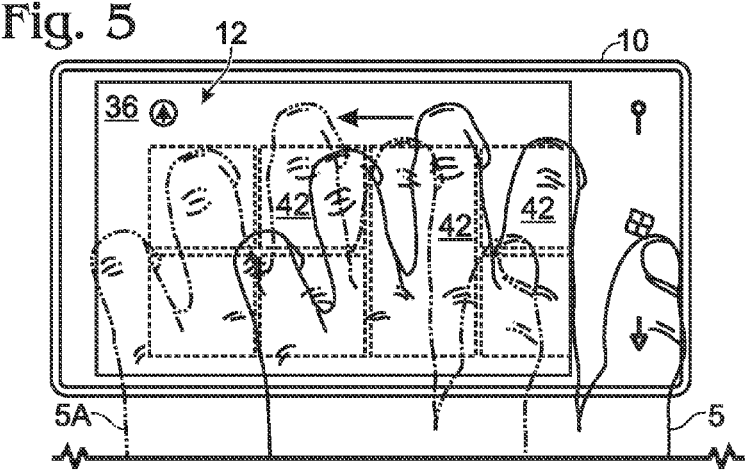
FIG. 5 is a top view illustrating the computing device of FIG. 1, shown with a third hand motion over the computing device.

FIG. 5 illustrates computing device 10 with a third hand motion being presented spaced apart from and over the display 12 of the computing device 10. The hand 5 is shown with fingers curled downward toward the display and moving right to left from a first position of the hand, shown at 5, to a second position of the hand, shown at 5A. Upon detecting the hand stopped and hovering in this position, having previously moved right to left, the touch event prediction module 40 may be configured to determine that the hand is a left hand, that the index fingers and middle finger are the most likely fingers to engage in selecting icons, and that the index and middle fingers are positioned over the three icons indicated as anticipated touch inputs 42. The remaining possible inputs are out of reach for the index and middle finger. Accordingly, these remaining possible inputs are not determined to be anticipated touch inputs 42.

Figure 6:
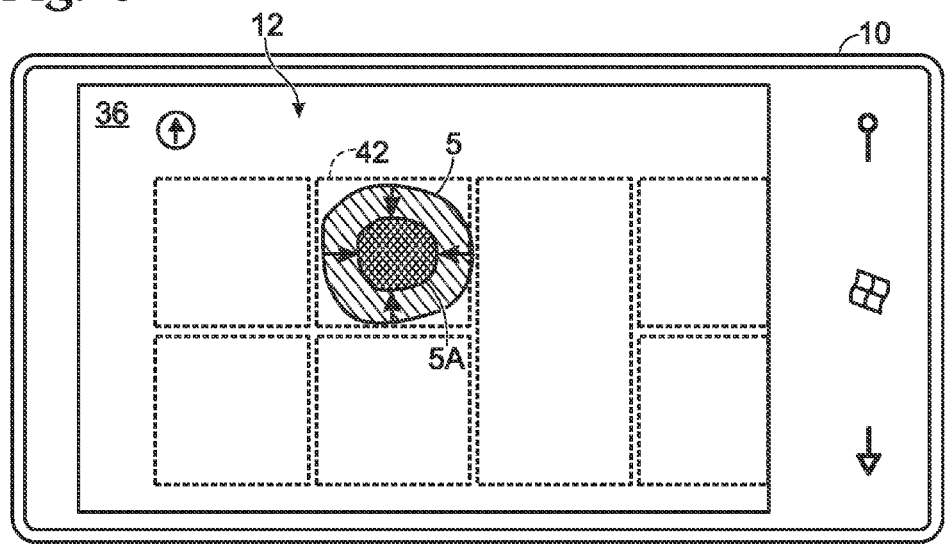
FIG. 6 is a top view illustrating the computing device of FIG. 1, shown with a fourth hand motion over the computing device.

FIG. 6 illustrates computing device 10 with a fourth hand motion being presented spaced apart from and over the display 12 of the computing device 10. In this view, an outstretched finger is approaching the display 12 orthogonally, into the page. The sensed shadow cast by the finger of the hand is shown as larger and more diffuse in a first position of the finger of the hand, shown at 5, and more sharp and smaller in a second position of the finger of the hand, shown at 5A. Upon detecting this orthogonal movement of the hand toward the display, the touch event prediction module 40 may be configured to determine that only the icon directly under the second position of the hand is an anticipated touch input 42, as indicated, since it is unlikely that any of the other possible inputs will be selected.

In some embodiments, an anticipated touch input may be provided to the user as feedback through an indication on the display. For example, one or more icons determined to be an anticipated touch input may become brighter and/or change color from other icons on the display. In another example, one or more icons determined to be an anticipated touch input may be visible and other icons may fade or disappear from the display. Icons may provide a reversible indication to the user in real-time in response to a hand motion (e.g. first, second, third and/or fourth hand motions described in FIGS. 3-6). In this way, a user may receive feedback associated with the anticipated touch input.

FIG. 7 is a flowchart illustrating an embodiment of a method 100 for anticipation of one or more touch events in a computing device. It will be appreciated that method 100 may be performed by the software and hardware components of the computing device 10 described above, or by other suitable hardware and software components.

Method 100 includes, at 102, displaying a graphical user interface including a state having a plurality of possible touch inputs on a touch sensitive display, such as a multi-touch display, of a computing device. At 104, the method includes sensing a position and/or movement of a user hand via a sensor of the computing device. The sensing may be performed by a sensor selected from the group consisting of in-pixel optical sensor, capacitive touch sensor, resistive touch sensor, and infrared sensor, for example, as described above. Alternatively, other sensor technologies may be employed.

As indicated at 106, sensing a position and/or movement of a user hand may further include detecting the position and/or movement of the hand when the hand is spaced apart a distance from a top surface of the display. Further, as indicated at 108, sensing a position and/or movement of a user hand may further include detecting a position and movement of one or more digits of the hand. This may enable the method to distinguish the difference between right and left hands, and between the individual digits a hand, which may be useful in determining the position and expected movement of the index and middle finger, which may be deemed most likely to perform touch input. Further, in some embodiments, as indicated at 110, sensing a position and/or movement of a user hand may further include detecting a position or movement of a stylus held by the hand, which may be used to more precisely predict the anticipated inputs.

At 112, the method may further include computing one or more anticipated touch inputs based on the sensed user hand position and/or movement, and the state of the user interface with the plurality of possible touch inputs. This computation may be performed by a prediction engine, and may be based on prior usage data, as described in detail below.

At 116, the method may include preprocessing data for each anticipated touch input. As illustrated at 118, preprocessing data may include preloading data to be displayed upon performance of each anticipated touch event into a cache. Further, as indicated at 120, preprocessing data may include performing advance computations for each anticipated touch event. The preprocessed data generated from the preprocessing at 116 may be stored in a known location that is communicated to a requesting program, so that the program can access and display the preprocessed data at a later time.

At 124, the method may include detecting an actual touch input that matches one of the anticipated touch inputs. The actual touch input is typically a gesture inputted by the user by contacting a digit and/or palm of the hand with a top surface of the display. This detection may be performed by the prediction module described above, or alternatively by an independent gesture recognition module executed on computing device 10.

At 126, the method includes displaying the preprocessed data the on the graphical user interface for the actual touch input. The display of the preprocessed data may be performed by a graphical user interface module of a program that displays the graphical user interface, after receiving communication from the preprocessing module that the preprocessed data is available at the known location and ready for display. By displaying the preprocessed data, latency may be reduced. That is, the lag between a user selection of a GUI element, and the display of subsequent data on the display will be reduced, with the attendant benefit of enhancing the user experience.

In some embodiments, method 100 may include, at 114, computing an estimated probability that each of the anticipated user inputs will be selected based on prior usage data, and at 122, performing preprocessing of data for anticipated user inputs with a higher probability, and forgoing preprocessing for anticipated user inputs with a lower probability, as described above.

In some embodiments, method 100 may optionally include an indication to the user of the anticipated touch input. The indication may include changing portions of the GUI to become brighter, change color, fade, and/or disappear in response to an anticipated user touch, as described above.

It will be appreciated that the steps of computing one or more anticipated touch inputs at 112, computing estimated probabilities at 114, and/or preprocessing data for each anticipated touch input at 116 may be performed wholly or at least in part by an application programming interface linking programs to operating system functionality on the computing device, as described above.

The above described systems and methods may be used to reduce latency in user interaction with a graphical user interface of a touch sensitive display on a computing device, thereby enabling the completion of tasks more quickly and enhancing the user experience.

The terms "module," "program," and "engine" are used herein to refer to software that performs one or more particular functions when executed by a processor of a computing device. These terms are meant to encompass individual or groups of executable files, data files, libraries, drivers, scripts, database records, for example. The embodiments described herein show one example organization of these modules, programs, and engines, however, it should be appreciated that the functions described herein may be accomplished by differently organized software components.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
    a multi-touch sensitive display including a sensor configured to first sense spaced apart input indicating a position and/or movement of a user hand when the user hand is spaced apart a distance from a top surface of the display, the sensor being further configured to then sense an actual touch input when the user hand is contacting the display;
    a graphical user interface displayed on the display, the graphical user interface having a state including a plurality of possible touch inputs, each of the plurality of touch inputs associated with a specific element of the graphical user interface;
    a touch event prediction module, executed by a processor, configured to compute one or more anticipated touch inputs based on the first sensed spaced apart input indicating the user hand position and/or movement relative to a current state of the user interface with the plurality of possible touch inputs prior to detecting the actual touch input from the user, the touch event prediction module including a statistics engine configured to compute an estimated probability that each of the anticipated touch inputs is selected based on prior usage data and based on at least two hover positions indicating movement of the user hand, and to instruct the preprocessing module to allocate preprocessing resources to one or more anticipated touch inputs with higher probability of selection and to forgo preprocessing of the other anticipated touch inputs; and
    a preprocessing module, executed by the processor, configured to, at the computing device, generate preprocessed data for each anticipated touch input, the preprocessed data associated with each of one or more elements of the graphical user interface, and upon the subsequent detection of the actual touch input received from the user which matches one of the anticipated touch inputs, cause the preprocessed data for the actual touch input to be displayed on the graphical user interface, the preprocessing module being further configured to preload data to be displayed upon anticipation of a touch input into a cache, and/or perform an advance computation for the anticipated touch input.

2. The computing device of claim 1, wherein the sensor is an in-pixel optical sensor, capacitive touch sensor, resistive touch sensor, pressure sensor, or infrared sensor.

3. The computing device of claim 1, wherein the touch event prediction module and the preprocessing module are part of an application programming interface linking programs to operating system functionality on the computing device.

4. The computing device of claim 1, wherein the computing device is configured as a mobile telephone, a tablet computing device, a laptop computer, a desktop computer, a tabletop computer, or a kiosk computer.

5. The computing device of claim 1, wherein the sensor is configured to detect position and/or movement of one or more digits of the user hand and/or a stylus held by the user hand.

6. The computing device of claim 1, wherein the computing device is configured to display an indication to the user of the anticipated touch input, wherein the indication includes changing portions of the graphical user interface to become brighter, change color, fade and/or disappear to provide user feedback of the anticipated touch input.

7. The computing device of claim 1, wherein:
    the sensor is configured to sense the spaced apart input by sensing that a shadow cast by the user hand onto the top surface of the display has become smaller and sharper over time; and
    in response, the touch event prediction module is further configured to determine that the user hand is moving toward one of the elements of the graphical user interface.

8. A computing method, comprising:
    displaying a graphical user interface including a state having a plurality of possible touch inputs on a touch sensitive display of a computing device, each of the plurality of touch inputs associated with a specific element of the graphical user interface;
    sensing spaced apart input indicating a position and/or movement of a user hand via a sensor of the computing device, when the user hand is spaced apart an orthogonal distance from a top surface of the display;
    computing one or more anticipated touch inputs based on the sensed spaced apart input indicating the user hand position and/or movement relative to a current state of the user interface with the plurality of possible touch inputs prior to detecting an actual touch input from a user when the user hand contacts the display;
    computing an estimated probability that each of the anticipated touch inputs will be selected based on prior usage data and based on at least two hover positions indicating movement of the user hand;
    preprocessing data at the computing device for anticipated touch inputs with a higher probability, and forgoing preprocessing for anticipated touch inputs with a lower probability by preloading data to be displayed upon performance of each anticipated touch input with the higher probability into a cache and performing an advanced computation for each touch input with the higher probability, the data associated with each of one or more elements of the graphical user interface;
    detecting the actual touch input which matches one of the anticipated touch inputs when the user hand contacts the display; and
    displaying the preprocessed data on the graphical user interface for the actual touch input.

9. The method of claim 8, wherein computing one or more anticipated touch inputs and preprocessing data for each anticipated touch input are performed at least in part by an application programming interface linking programs to operating system functionality on the computing device.

10. The method of claim 8, wherein sensing is performed by a sensor selected from the group consisting of in-pixel optical sensor, capacitive touch sensor, resistive touch sensor, and infrared sensor.

11. The method of claim 8, wherein sensing the position and/or movement of the user hand further includes:
   detecting a position and/or movement of one or more digits of the user hand or a stylus held by the user hand.

12. The method of claim 8, further comprising:
   displaying an indication to the user of the anticipated touch input on the display, wherein the indication includes changing portions of the graphical user interface to become brighter, change color, fade and/or disappear to provide user feedback of the anticipated touch input.

13. The computing device of claim 8, wherein the computing device is configured as a mobile telephone, a tablet computing device, a laptop computer, a desktop computer, a tabletop computer, or a kiosk computer.

14. A computing method, comprising:
   displaying a graphical user interface on a touch sensitive display of a computing device, the graphical user interface including a state having a plurality of possible touch inputs, each of the plurality of touch inputs associated with a specific element of the graphical user interface;
   sensing spaced apart input indicating a position and/or movement of a user hand when the user hand is spaced apart a distance from a top surface of the display via a sensor of the computing device;
   computing one or more anticipated touch inputs based on the sensed spaced apart input indicating the user hand position and/or movement relative to a current state of the user interface with the plurality of possible touch inputs prior to detecting an actual touch input from a user when the user hand contacts the display; and
   computing an estimated probability that each of the anticipated touch inputs will be selected based on prior usage data and based on at least two hover positions indicating movement of the user hand;
   at the computing device, preprocessing data for anticipated touch inputs with a higher probability, and forgoing preprocessing for anticipated touch inputs with a lower probability by preloading data to be displayed upon performance of each anticipated touch input with the higher probability into a cache and/or by performing an advance computation for each anticipated touch input with the higher probability, the preloaded data associated with each of one or more elements of the graphical user interface;
   detecting the actual touch input which matches one of the anticipated touch inputs when the user hand contacts the display; and
   displaying the preprocessed data on the graphical user interface for the actual touch input;
   wherein the computing device is configured as a mobile telephone, a tablet computing device, a laptop computer, a desktop computer, a tabletop computer, or a kiosk computer.

* * * * *